US 6,601,982 B1

(12) United States Patent
Begemann et al.

(10) Patent No.: US 6,601,982 B1
(45) Date of Patent: *Aug. 5, 2003

(54) VEHICLE HEADLAMP AND A VEHICLE

(75) Inventors: Simon H. A. Begemann, Eindhoven (NL); Gerard Harbers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 22 days.

This patent is subject to a terminal disclaimer.

(21) Appl. No.: 09/599,791

(22) Filed: Jun. 22, 2000

(30) Foreign Application Priority Data

Jun. 25, 1999 (EP) .............................. 99202053

(51) Int. Cl.$^7$ ............................ F21V 29/00
(52) U.S. Cl. .................. 362/545; 362/800; 362/525; 362/257
(58) Field of Search ............... 362/510, 509, 362/525, 800, 545, 257

(56) References Cited

U.S. PATENT DOCUMENTS

| 5,023,763 A | * | 6/1991 | Le Gars | 36/240 |
| 5,947,587 A | * | 9/1999 | Keuper et al. | 362/235 |
| 6,234,648 B1 | * | 5/2001 | Borner et al. | 362/235 |
| 6,286,984 B1 | * | 9/2001 | Berg | 362/505 |
| 6,406,172 B1 | * | 6/2002 | Harbers et al. | 362/544 |

FOREIGN PATENT DOCUMENTS

| GB | 2200199 A | 7/1988 | ............ B60Q/1/04 |

* cited by examiner

*Primary Examiner*—Sandra O'Shea
*Assistant Examiner*—Anabel Ton
(74) *Attorney, Agent, or Firm*—Frank Keegan

(57) ABSTRACT

A headlamp (2; 3) of a vehicle (1) has a light source (4; 5) comprising a plurality of opto-electronic elements (11; 12; 13; 14), preferably light-emitting diodes (LED's). At least one of these opto-electronic elements (11; 12; 13; 14) has, in operation, a luminous flux of 5 lm or higher. According to the invention, the spectral characteristic of the light beam (6, 6'; 7, 7') generated by the light source (4; 5) depends upon the position in the light beam (6, 6'; 7, 7'). Preferably, the light source (4; 5) comprises opto-electronic elements (11; 12; 13; 14) only. The light beam comprises at least two light beam segments (6, 6'; 7, 7') having essentially different spectral characteristics. Preferably, one of the light beam segments (6'; 7') is mesotopically tuned. In particular, a first light beam segment (6; 7) comprises a considerable amount of white or yellow-orange light, and a second light beam segment (6'; 7') comprises a considerable amount of blue-green light.

2 Claims, 5 Drawing Sheets

VEHICLE HEADLAMP AND A VEHICLE

CROSS REFERENCE TO RELATED APPLICATION

Applicants' application Ser. No. 09/599,792 filed Jun. 22, 2000 discloses related subject matter.

BACKGROUND OF THE INVENTION

The invention relates to a vehicle headlamp comprising a light source.

The invention also relates to a vehicle provided with a headlamp.

Such headlamps are used on vehicles, such as cars, trucks, buses, bicycles and on vessels and aircraft.

Vehicle headlamps are known per se. A vehicle headlamp generally comprises an electric lamp with an incandescent body, for example, in a halogen-containing inert gas (a so-called halogen lamp) or an electric lamp with a pair of electrodes in an ionizable gas (a so-called discharge lamp). Such headlamps are customarily built up of two light sources which, in operation, generate either a so-called passing beam or a so-called main beam. Vehicle headlamps are known wherein the light source for the passing beam and the light source for the main beam are housed in a single lamp vessel (the so-called H4). Other known vehicle headlamps are those wherein two types of light sources are used, for example a halogen lamp in combination with a discharge lamp or in combination with a ring of light-emitting diodes. There are also headlamps which, in operation, generate colored light, which is generally brought about by a suitable coating provided on an outer surface of the lamp vessel. GB-A 2 200 199 discloses a vehicle headlamp the color of the light of which changes by switching from a first (colorless white) light source to a second light source with a color filter.

A drawback of the known vehicle headlamp is that the visibility of the part of the surroundings of the vehicle illuminated by the light source is insufficient.

SUMMARY OF THE INVENTION

It is an object of the invention to provide a vehicle headlamp of the type described in the opening paragraph, which headlamp provides an improved visibility of the surroundings of the vehicle.

To achieve this, the vehicle headlamp is characterized in accordance with the invention in that a luminous flux of at least one of the opto-electronic elements is at least 5 lm during operation, and in that the spectral characteristic of a light beam generated by the light source depends upon the position in the light beam.

Opto-electronic elements, also referred to as electro-optical elements, for example electroluminescent elements, such as light-emitting diodes (LED's) with a luminous flux of 5 lm or more can suitably be used as a light source for vehicle headlamps. A relatively high luminous flux is necessary to ensure that also under ambient light conditions, for example sunlight or light originating from headlamps of other vehicles, sufficient light is generated so that a light beam generated by the light source can be observed sufficiently clearly from a distance.

To generate a so-called passing beam and/or a so-called main beam, a conventional vehicle headlamp requires a luminous flux ranging between 600 and 1000 lm to meet internationally standardized and specified light beam intensities. Current technology of opto-electronic elements, particularly that of light-emitting diodes, has yielded two different material systems which can suitably be used for different regions of the visible spectrum, i.e. Al In Ga N for blue-green light and Al In Ga P for yellow-red light. As a result, any desired spectral characteristic can be produced by combining suitable light-emitting diodes.

The use of a plurality of opto-electronic elements with a relatively high luminous flux enables a vehicle headlamp to be manufactured which provides an improved view of the surroundings of the vehicle. By making the spectral characteristic of the light beam generated by the light source dependent upon the position in the light beam, objects situated outside the center of the light beam are better observed. This observation of objects outside the center of the light beam is also referred to as off-axis viewing, as opposed to the so-called on-axis viewing, which refers to the visibility of objects situated on or in the vicinity of the axis of the light beam, in other words objects situated in the center or proximate to the center of the light beam (for example oncoming traffic). Examples of off-axis viewing are the observation of objects situated at or near the edge of the viewing field of the driver of the vehicle, for example the shoulder of the road, (unlit) objects, such as pedestrians or cyclists at the edge of the road on which the vehicle is traveling, and the observation of vehicles on a road which crosses the road on which the vehicle provided with the headlamp in accordance with the invention is traveling.

The known vehicle headlamp has two types of light beam, namely colorless white light or colored light, but each one of the light beams is generated by switching from a first light source to a second light source provided with a color filter. The individual light beams of the known vehicle headlamp do not demonstrate a substantial change in spectral characteristic as a function of the position in the light beam.

An embodiment of the vehicle headlamp is characterized in accordance with the invention in that the light source consists of a plurality of opto-electronic elements. Consequently, the vehicle headlamp is composed of one type of light source. By combining LED's or so-called multi-chip packages having a luminous flux in the range from 10–250 lm, the luminous flux of a suitable combination of 25 such elements, or fewer, preferably a combination of 15 such elements, or fewer, such as a combination of four such elements, meets the international standard ranging between 600 and 1000 lm. The dimensions of a vehicle headlamp comprising such a relatively small number of opto-electronic elements are comparable to the dimensions of a conventional vehicle headlamp. An additional advantage of the use of LED's is that the service life of these opto-electronic elements is very long as compared to that of the conventional vehicle headlamp.

In a preferred embodiment of the vehicle headlamp in accordance with the invention, the light beam comprises at least two beam segments having a substantially different spectral characteristic. In general, the intensity of the light beam emitted by a vehicle headlamp decreases as a function of the position in the light beam, i.e. the intensity is maximal in the center of the light beam and gradually decreases in the direction of positions situated at a larger distance from the center of the light beam. As a result, the intensity of the light for so-called on-axis viewing is relatively much higher than for the so-called off-axis viewing.

It is well-known that the sensitivity of the human eye changes with the wavelength of the light and that equal quantities of energy of different wavelengths generally cause different sensations of brightness. In other words, if we consider a spectrum, and the received energy (per unit of time) is equal for all wavelengths, the middle of the visible region will apparently be brighter than the red and the blue ends. If the intensity of the light is relatively high (luminous efficiency$\geq 3.5$ cd/m$^2$), the maximum of the brightness lies at a wavelength of 555 nm (green/yellow), the so-called photopic eye-sensitivity curve. At this wavelength, particularly the cones are active in the human eye. If the intensity of the light is relatively low (luminous efficiency$\leq 0.035$ cd/m$^2$), the maximum of the brightness lies at a wavelength of 507 nm (blue/green or cyan blue), the so-called scotopic eye-sensitivity curve. At this wavelength, particularly the rods are active in the human eye.

The inventors have recognized that it is advantageous to bring about substantially different spectral characteristics of the light beam for the on-axis and the off-axis parts of the light beam. In particular, in the off-axis parts of the light beam, the spectral characteristic of the light is adapted to a light intensity which is relatively low. By thus making the spectral characteristic of the light beam generated by the light source dependent upon the position in the light beam, the visibility of objects situated outside the center of the light beam is improved.

It is noted that, in practice, also photopic and scotopic light beams preferably have a broad spectrum, which light beams both have a more or less "white" appearance. The difference between a photopic and a scotopic light beam corresponds, as it were, to a difference between a light beam having a high and a low color temperature.

There is a possibility that the above-mentioned beam segments may comprise segments demonstrating a partial overlap. A possibly non-continuous transition between the beam segments may be perceived as unpleasant by the driver of the vehicle.

An embodiment of the vehicle headlamp in accordance with the invention is characterized in that the spectral characteristic of one of the beam segments is mesotopically tuned. The range between the photopic and the scotopic eye-sensitivity curve is referred to as mesotopic eye sensitivity curve ($0.035 \leq$ luminous efficacy$\leq 3.5$ cd/m$^2$). By adapting the spectral characteristic of the light originating from the light beam of the vehicle headlamp in accordance with the invention, particularly in the off-axis parts of the light beam, to a spectral characteristic adapted to a light intensity which is relatively low, objects situated outside the center of the light beam are better observed. As a result thereof, the driver of the vehicle has a better view of the surroundings of the vehicle.

In a preferred embodiment of the vehicle headlamp in accordance with the invention, a first beam segment has a spectral characteristic which is rich in green-yellow light, and a second beam segment has a spectral characteristic which is rich in blue-green light. On the one hand, in the on-axis part of the light beam (the first beam segment), a spectral characteristic of the light is presented which is adapted to the photopic eye-sensitivity curve, i.e. rich in green-yellow light. On the other hand, in the off-axis parts of the light beam (the second beam segment), a spectral characteristic of the light is presented which is adapted to the scotopic eye-sensitivity curve, i.e. rich in blue-green light.

These and other aspects of the invention will be apparent from and elucidated with reference to the embodiments described hereinafter.

BRIEF DESCRIPTION OF THE DRAWINGS

These Figures are purely diagrammatic and not drawn to scale. Particularly for clarity, some dimensions are exaggerated strongly. In the Figures, like reference numerals refer to like parts whenever possible.

DETAILED DESCRIPTION OF THE PREFERRED EMBODIMENTS

Figure 1A:
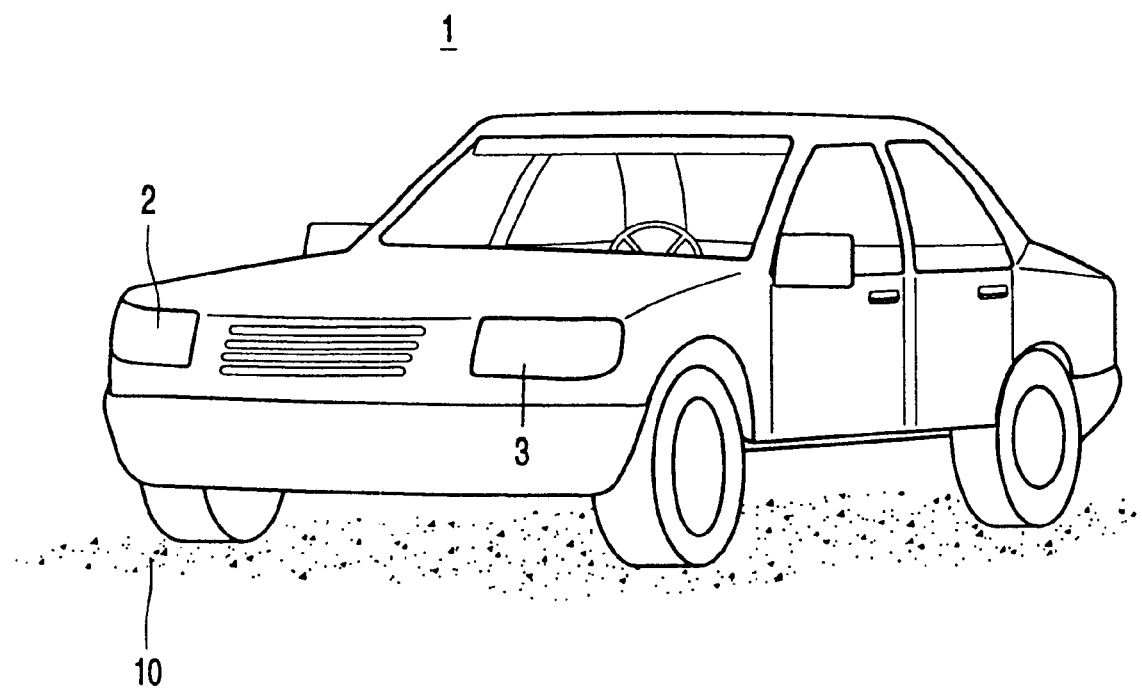
FIG. 1A is a perspective view of a vehicle provided with a headlamp in accordance with the invention.
Figure 1B:
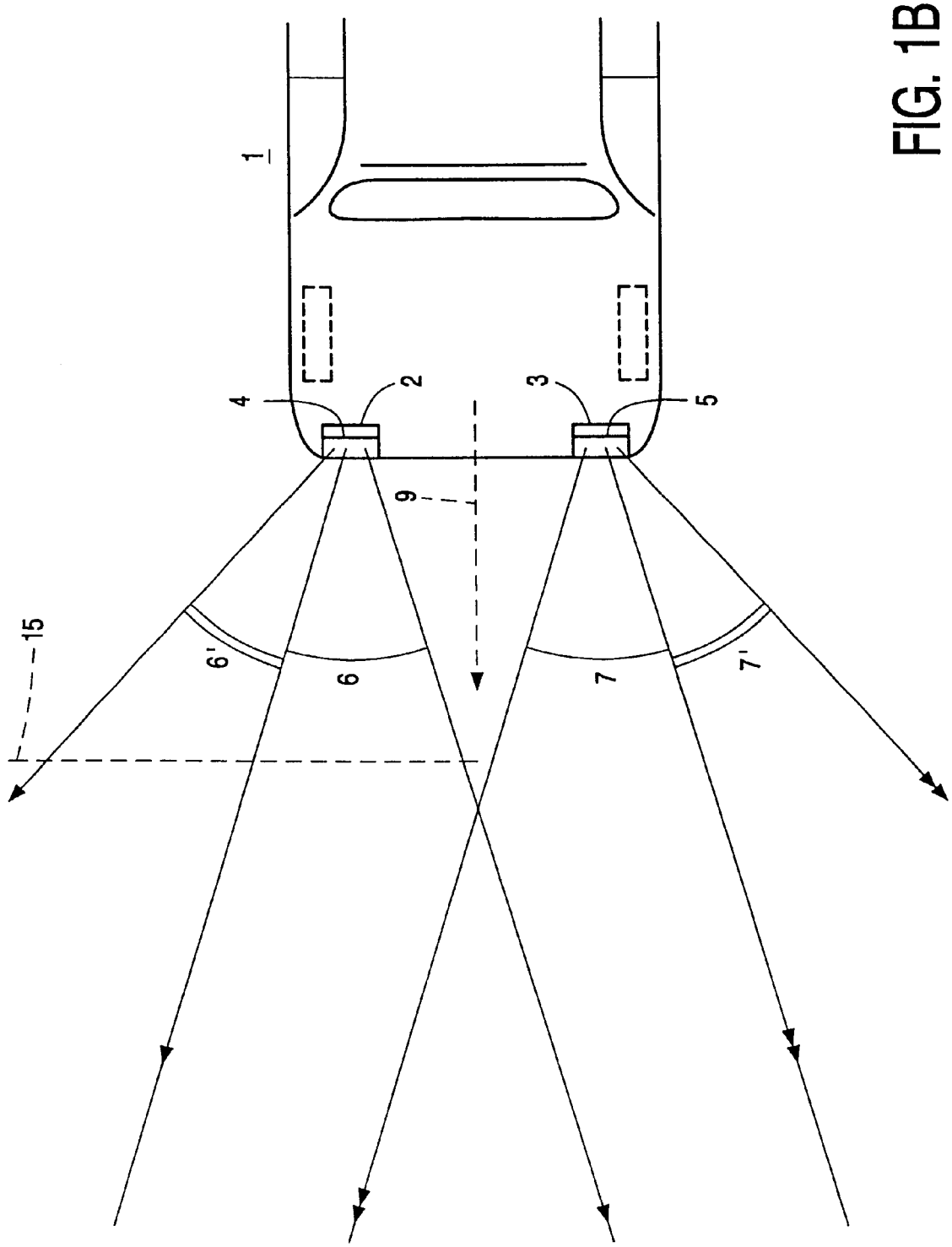
FIG. 1B is a plan view of a part of the vehicle shown in FIG. 1A.

FIG. 1A is a very diagrammatic, perspective view of a vehicle 1 situated on a road 10 and provided with a headlamp 2; 3 in accordance with the invention. FIG. 1B is a diagrammatic, plan view of a part of the vehicle 1 shown in FIG. 1A. Each one of the vehicle headlamps 2; 3 is provided with a light source 4; 5, which emits (diverging) light beams 6, 6'; 7, 7', in a longitudinal direction 9. FIG. 1B further shows an imaginary screen 15 for trapping the light emitted by the light beams 6, 6'. In accordance with the invention, the spectral characteristic of the light beams 6, 6'; 7, 7' generated by the light source 4; 5 depends upon the position in the light beam 6, 6'; 7, 7'.

In the example shown in FIG. 1B, each one of the light beams of the light source 4; 5 of the vehicle headlamp 2; 3 is subdivided into two beam segments 6, 6'; 7, 7', with a first beam segment 6; 7 having a spectral characteristic which differs substantially from the spectral characteristic of a second beam segment 6'; 7'. The light beams may alternatively be composed of a plurality of beam segments, for example three or four beam segments with different spectral characteristics. Alternatively, the light originating from two or more beam segments may demonstrate an overlap. As a result of the generally diverging character of the light beams, an area of overlap between the various beam segments 6, 6'; 7, 7' is often unavoidable.

Figure 2:
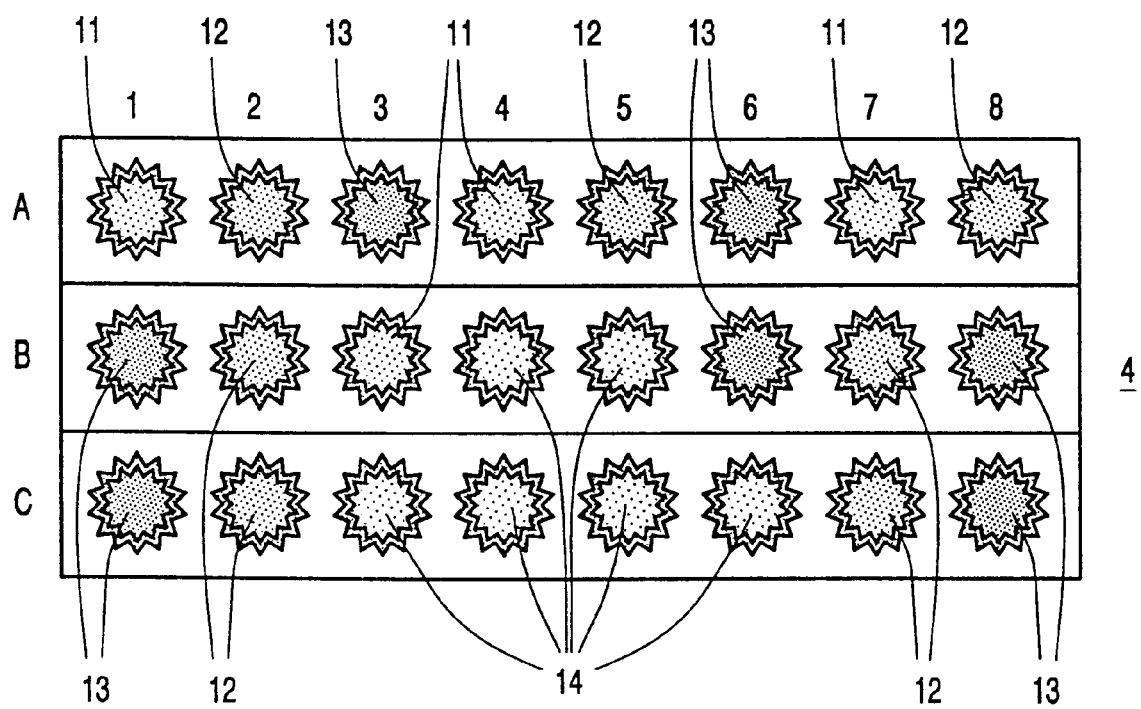
FIG. 2 is a sectional view of a light source comprising a plurality of opto-electronic elements arranged in accordance with a regular pattern.

FIG. 2 is a sectional view of the light source 4 comprising a plurality of opto-electronic elements 11; 12; 13; 14 which are arranged in accordance with a regular pattern. Similarly, a plurality of opto-electronic elements may be provided in the light source 5 (not shown). The pattern in which the opto-electronic elements are ordered in light source 4 may differ from that in light source 5. For example, for reasons of symmetry, the pattern in which the opto-electronic elements are ordered in the light source 5 may be mirrored-inverted with respect to that in light source 4. In addition, the number of opto-electronic elements 11; 12; 13; 14 in light source 4 does not have to be equal to that in light source 5. The array of opto-electronic elements 11; 12; 13; 14 does not have to be provided on a flat substrate, it may alternatively be provided on a curved substrate. The shape of the substrate on which the array of opto-electronic elements 11; 12; 13; 14 is provided is determined to a substantial degree by the desired direction of the light beams emitted by the various opto-electronic elements 11; 12; 13; 14.

In accordance with the invention, the luminous flux of at least one of the opto-electronic elements 11; 12; 13; 14 is at least 5 lm in operation. Preferably, in operation, all opto-electronic elements 11; 12; 13; 14 have a luminous flux above 5 lm. Preferably, the vehicle headlamp 2; 3 is composed of a single type of light source 4; 5. In other words, the light source 4; 5 is preferably exclusively composed of a plurality of opto-electronic elements 11; 12; 13; 14.

If opto-electronic elements with a luminous flux of 5 lm or more are to be efficiently employed, it is desirable to provide the vehicle headlamp with heat-dissipating means. For example, the substrate on which the opto-electronic elements 11; 12; 13; 14 are provided may consist of a metal or a metal alloy. As a result, a good heat conduction from the opto-electronic elements 11; 12; 13; 14 to the substrate is achieved.

In the example shown in FIG. 2, the light source 4; 5 is exclusively composed of a plurality of light-emitting diodes (LED's). In this example an array of 8×3 LED's. For identification purposes, in FIG. 2 the rows are indicated by letters A, B, C, and the columns by digits 1–8. By using LED's or so-called multi-chip packages with a luminous flux in the range from 10–250 lm for blue, yellow/orange, red and green light, the luminous flux of a suitable combination of 25 such elements, or fewer, preferably a combination of 15 such elements, or fewer, for example a combination of 4 such elements meets the internationally standardized and specified intensities for generating the passing beam and/or the main beam, which intensities lie in the range between 600 and 1000 lm. The dimensions of a vehicle headlamp 2; 3 having such a relatively small number of opto-electronic elements 11; 12; 13; 14 are comparable to, or much smaller than, the dimensions of a conventional vehicle headlamp.

By using a plurality of opto-electronic elements 11; 12; 13; 14, and by selectively switching on and off a number of opto-electronic elements 11; 12; 13; 14, the light beams generated by the light source 4; 5 can be relatively readily subdivided into one or more beam segments 6, 6'; 7, 7' having substantially different spectral characteristics. The vehicle 1 or the vehicle headlamp 2; 3 is preferably provided with means (not shown) for changing the luminous flux of the opto-electronic elements 11; 12; 13; 14 with respect to each other.

In the example shown in FIG. 2, red LED's are indicated by reference numeral 11, green LED's by reference numeral 12, blue LED's by reference numeral 13, and yellow or white LED's by reference numeral 14. By placing the LED's in the manner indicated in FIG. 2, a substantial reduction of possible color effects is achieved for an observer looking into the light emitted by the vehicle headlamp (for example an oncoming car). In addition, optical systems which effectively mix the colors originating from the LED's are available. This is important, in particular, to ensure that the red LED's are not mistakenly taken for brake lights.

The example of the array of LED's as shown in FIG. 2 represents an integrated module generating at least four types of light beams, namely a passing beam, a main beam, a beam for bad weather conditions and a beam which is specially adapted for use in areas where the intensity of the light is relatively low.

The ordering, providing and selectively switching on and off of opto-electronic elements 11; 12; 13; 14 in the form of an array may also be considered as an invention in itself.

Figure 3A:
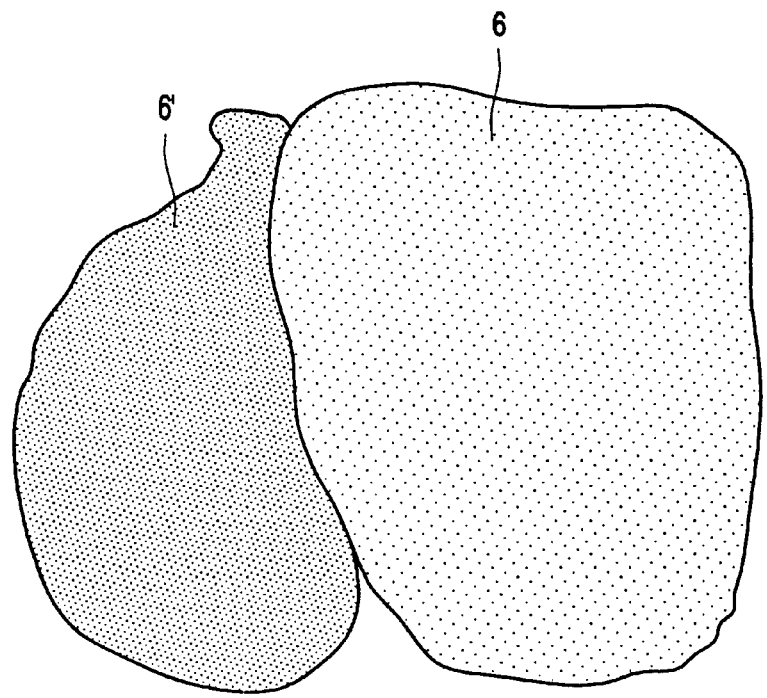
FIG. 3A shows a so-called passing beam generated by a first beam segment in combination with a so-called off-axis light beam generated by a second beam segment.

FIG. 3A shows a so-called passing beam generated by a first beam segment 6 in combination with a so-called off-axis light beam generated by a second beam segment 6'. The light originating from the beam segments 6, 6' is trapped by the imaginary screen 15 (see FIG. 1B), in which case an observer looks against the longitudinal direction 9. With reference to FIG. 2, the first, so-called on-axis beam segment 6, is generated by light beams originating from LED's A1–A8, B3, B6 and B7, while the second, so-called off-axis beam segment 6', is generated by light beams originating from LED's B1, B2, C1 and C2. The other LED's, as shown in FIG. 2, are switched off under these lighting conditions.

Figure 3B:
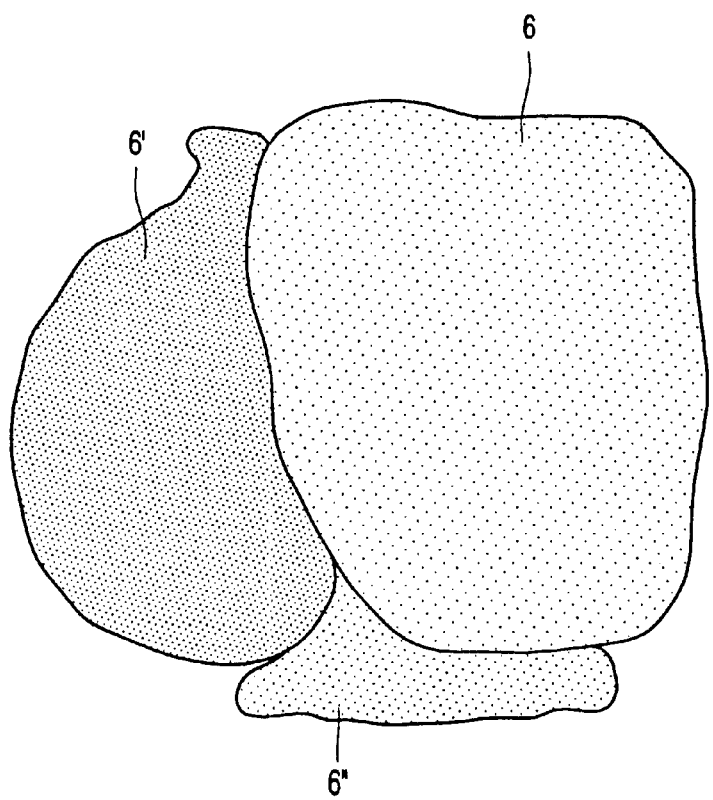
FIG. 3B shows the passing beam and the off-axis light beam of FIG. 3A in combination with a so-called main beam.

FIG. 3B shows, in addition to the passing beam and the off-axis beam of FIG. 3A, a so-called main beam which serves predominantly to improve the on-axis observation conditions. By additionally switching on the yellow or white LED's B4 and B5, a third beam segment 6" is obtained. The spectral characteristics of the first beam segment 6 and the third beam segment 6" may be different. For example, it may be desirable to increase in the main beam (beam segment 6") the quantity of in particular yellow light in order to improve the long-distance visibility. It may also be desirable, upon switching on the main beam (beam segment 6"), to switch off a part of the passing beam (beam segment 6) and/or of the off-axis beam segment 6'.

In order to improve the view of the surroundings of the vehicle 1, a substantially different spectral characteristic of the light beam is brought about between the on-axis parts and the off-axis parts of the light beam. In particular, in the off-axis beam segment 6', 7' of the light beam, the spectral characteristic of the light is adapted to a light intensity which is relatively low. To obtain a good observation field at relatively low light intensities, preferably the spectral characteristic of one of the beam segments 6'; 7' is mesotopically tuned. This can be achieved by providing the first beam segment 6; 7 and the third beam segment 6"; 7" with a spectral characteristic which is rich in white or yellow-orange light and by providing the second beam segment 6', 7' with a spectral characteristic which is rich in blue-green light. By thus rendering the spectral characteristic of the light beam generated by the light source dependent upon the position in the light beam, objects situated outside the center of the light beam are better observed.

Figure 4A:
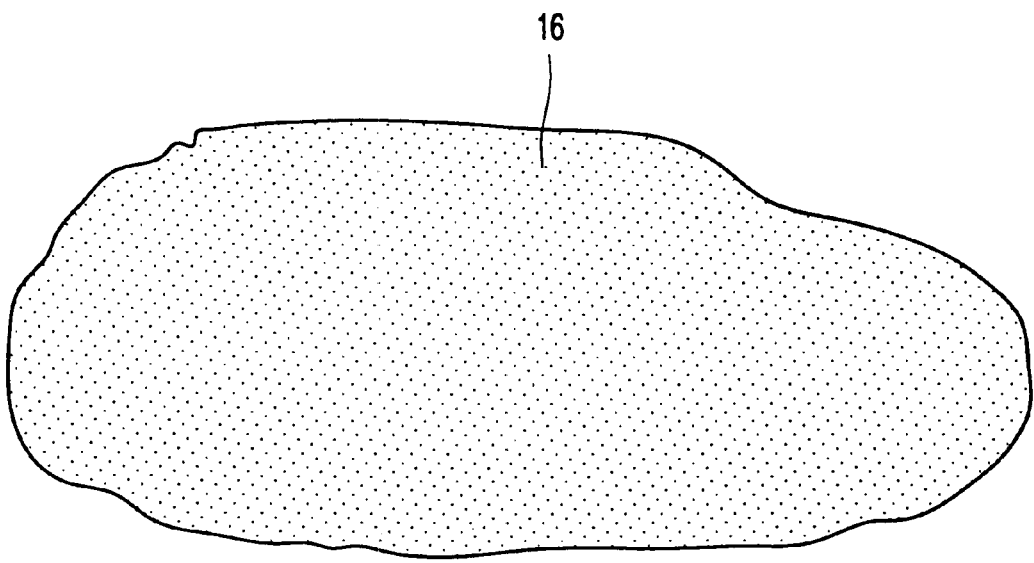
FIG. 4A shows a relatively broad light beam which predominantly consists of yellow light.

Under unfavorable weather conditions, in particular fog and snow, when visibility is reduced by backscattering caused by fog or snow particles, both the configuration and the spectral composition of the light beams generated by the light source 4; 5 can be adapted by activating different combinations of LED's and by changing the output levels of the various LED's. As a result of these adaptations, the overall spectral distribution of the light is changed. An example of such an adaptation is shown in FIG. 4A, wherein a relatively wide beam 16 is obtained which is substantially composed of yellow light. The absence of the blue component in the visible light causes the effect of backscattering to be substantially reduced.

Figure 4B:
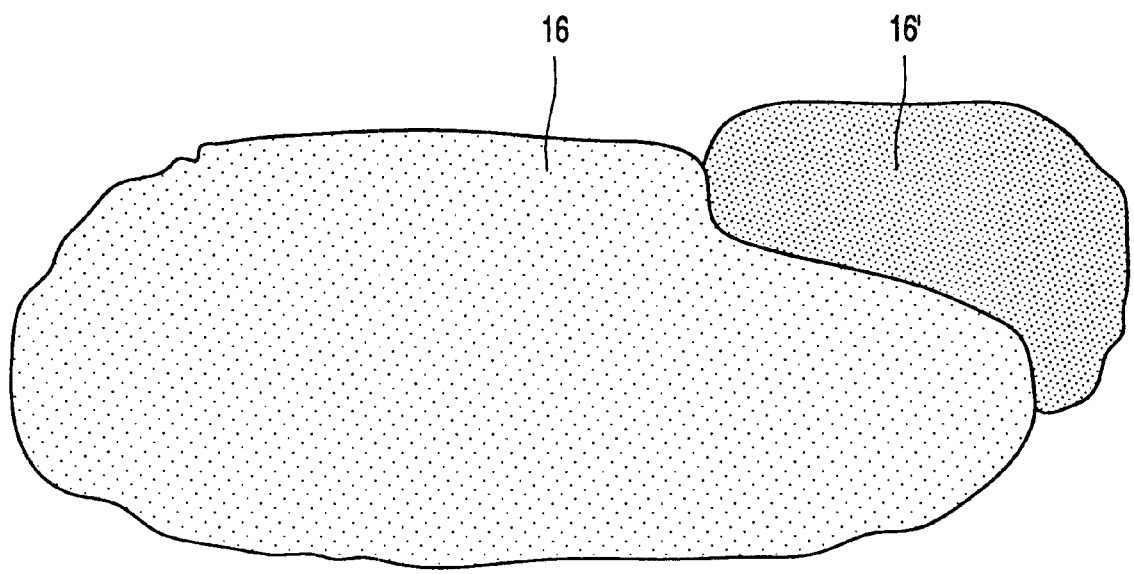
FIG. 4B shows the relatively broad light beam of FIG. 4A in combination with a side light beam in dependence upon the position of the steering wheel of the vehicle.

FIG. 4B shows the relatively wide beam 16 of FIG. 4A in combination with a side light beam 16' whose shape and intensity and position are dependent upon the position of the steering wheel of the vehicle 1. Such a side light beam 16' is preferably not switched on until the steering wheel of the vehicle exceeds a predetermined limiting angle when taking a bend or turning off. In this manner, the surface area and the space wherein the vehicle is situated and where the vehicle is heading are dynamically illuminated as early as possible.

In general, the LED modules operate at a low-voltage direct current, so that they can be advantageously employed in a vehicle.

It will be obvious that within the scope of the invention many variations are possible to those skilled in the art. For example, the vehicle headlamp may have many different shapes, such as (rect)angular, round, oval, etc. One or more opto-electronic elements may also be suitable for use as indicator. In principle, the dimensions of the light beams are adjustable at will, for example, by creating a broader light beam (illuminating the shoulder of the road) at a lower speed of the vehicle, or by narrowing the beam at a relatively high speed. In addition, as a result of the large freedom of choice resulting from the use of (exclusively) opto-electronic elements, the location of the vehicle headlamp is no longer limited to the conventional location (at the front of the vehicle just above the road surface). It may be desirable to provide at least a part of the opto-electronic elements near the windscreen of the vehicle 1. It is also possible to provide a further part of the opto-electronic elements on a side face of the vehicle. A future increase in the efficiency and light output of the LED's will enable the number of LED's to be further reduced.

The scope of protection of the invention is not limited to the above examples. The invention is embodied in each novel characteristic and each combination of characteristics. Reference numerals in the claims do not limit the scope of protection thereof. The use of the term "comprising" does not exclude the presence of elements other than those mentioned in the claims. The use of the word "a" or "an" before an element does not exclude the presence of a plurality of such elements.

What is claimed is:

1. A vehicle provided with a headlamp, wherein the headlamp comprises a light source having a plurality of opto-electronic elements, a luminous flux of at least one of the opto-electronic elements being at least 5 lm during operation and a light beam generated by the light source having a spectral characteristic depending upon a position in the light beam, the luminous flux of the opto-electronic elements being adjustable with respect to each other.

2. A vehicle lamp comprising a light source having a plurality of opto-electronic elements, a luminous flux of at least one of the opto-electronic elements being at least 5 lm during operation and a light beam generated by the light source having a spectral characteristic depending upon a position in the light beam, the luminous flux of the opto-electronic elements being adjustable with respect to each other.

* * * * *